United States Patent [19]

Standing et al.

[11] 4,073,952
[45] Feb. 14, 1978

[54] METHOD OF MAKING DEHYDRATED POTATO

[75] Inventors: Charles N. Standing; Hamilton A. Olabode, both of Minneapolis, Minn.

[73] Assignee: The Pillsbury Company, Minneapolis, Minn.

[21] Appl. No.: 710,990

[22] Filed: Aug. 2, 1976

[51] Int. Cl.² .............................. A23B 7/02; A23B 7/06
[52] U.S. Cl. .......................................... 426/242; 34/4; 34/12; 219/10.55 M; 426/456; 426/464
[58] Field of Search ............... 426/242, 637, 456, 464, 426/469, 466, 465, 482, 241; 34/4, 12; 219/10.55 M, 10.55 A

[56] References Cited

U.S. PATENT DOCUMENTS

| 2,705,679 | 4/1955 | Griffiths et al. ................. 426/445 X |
| 3,244,538 | 4/1966 | Kaehler ................................ 426/438 |
| 3,277,580 | 10/1966 | Tooby ....................... 219/10.55 A X |
| 3,365,301 | 1/1968 | Lipoma et al. ......................... 426/242 |
| 3,409,447 | 11/1968 | Jeppson ..................... 219/10.55 A X |
| 3,437,495 | 4/1969 | Jeppson ................................ 426/241 |
| 3,578,463 | 5/1971 | Smith et al. .......................... 426/241 |
| 3,764,716 | 10/1973 | Rainwaber et al. ................. 426/453 |
| 3,812,274 | 5/1974 | Weaver et al. ....................... 426/438 |
| 3,859,493 | 1/1975 | Peterson .................. 219/10.55 M X |
| 3,908,029 | 9/1975 | Fredrickson ......................... 426/242 |

FOREIGN PATENT DOCUMENTS

| 1,344,125 | 1/1974 | United Kingdom. |
| 1,034,035 | 6/1966 | United Kingdom ................. 426/242 |
| 622,013 | 4/1949 | United Kingdom ........ 219/10.55 M |

OTHER PUBLICATIONS

Talburt, et al.; Potato Processing; The Avi Pub. Co. Inc., Westport Conn., 1959; pp. 356–367.
Talburt, et al.; Potato Processing; The Avi Pub. Co. Inc., Westport, Conn., 1959; pp. 243, 260, 269, 287–290.

Primary Examiner—S. Leon Bashore
Assistant Examiner—Kenneth M. Schor
Attorney, Agent, or Firm—James V. Harmon; Michael D. Ellwein

[57] ABSTRACT

A dehydrated potato product is described which consists of porous cut pieces of potato containing 0-12% moisture. The surface of each piece is composed of uniformly distinct individual potato cells with only a few of the cell boundaries indistinct and fused together. The product has a blue value of less than 100, shrinkage or collapse of about 40-58% of the original piece thickness, a density of between about 0.20-0.25 gm/cc. The pieces remain distinct and intact after rehydration in boiling water and retain the graininess and flavor of natural potato. The product can be made by peeling and slicing potatoes, blanching, cooling to about 80° F. or lower and drying them by exposing them to hot air to which moisture has been added and simultaneously to microwave energy sufficient to provide about 50-90% of the total drying energy input until the moisture content has reached 12% or less.

9 Claims, 1 Drawing Figure

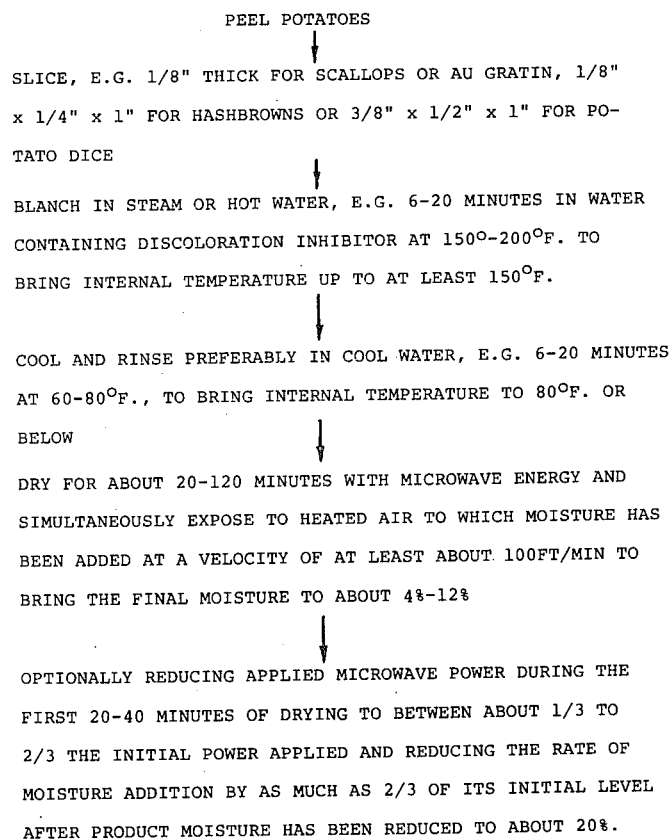

PEEL POTATOES
|
SLICE, E.G. 1/8" THICK FOR SCALLOPS OR AU GRATIN, 1/8" x 1/4" x 1" FOR HASHBROWNS OR 3/8" x 1/2" x 1" FOR POTATO DICE
|
BLANCH IN STEAM OR HOT WATER, E.G. 6-20 MINUTES IN WATER CONTAINING DISCOLORATION INHIBITOR AT 150°-200°F. TO BRING INTERNAL TEMPERATURE UP TO AT LEAST 150°F.
|
COOL AND RINSE PREFERABLY IN COOL WATER, E.G. 6-20 MINUTES AT 60-80°F., TO BRING INTERNAL TEMPERATURE TO 80°F. OR BELOW
|
DRY FOR ABOUT 20-120 MINUTES WITH MICROWAVE ENERGY AND SIMULTANEOUSLY EXPOSE TO HEATED AIR TO WHICH MOISTURE HAS BEEN ADDED AT A VELOCITY OF AT LEAST ABOUT 100FT/MIN TO BRING THE FINAL MOISTURE TO ABOUT 4%-12%
|
OPTIONALLY REDUCING APPLIED MICROWAVE POWER DURING THE FIRST 20-40 MINUTES OF DRYING TO BETWEEN ABOUT 1/3 TO 2/3 THE INITIAL POWER APPLIED AND REDUCING THE RATE OF MOISTURE ADDITION BY AS MUCH AS 2/3 OF ITS INITIAL LEVEL AFTER PRODUCT MOISTURE HAS BEEN REDUCED TO ABOUT 20%.

PEEL POTATOES
↓
SLICE, E.G. 1/8" THICK FOR SCALLOPS OR AU GRATIN, 1/8" x 1/4" x 1" FOR HASHBROWNS OR 3/8" x 1/2" x 1" FOR POTATO DICE
↓
BLANCH IN STEAM OR HOT WATER, E.G. 6-20 MINUTES IN WATER CONTAINING DISCOLORATION INHIBITOR AT 150°-200°F. TO BRING INTERNAL TEMPERATURE UP TO AT LEAST 150°F.
↓
COOL AND RINSE PREFERABLY IN COOL WATER, E.G. 6-20 MINUTES AT 60-80°F., TO BRING INTERNAL TEMPERATURE TO 80°F. OR BELOW
↓
DRY FOR ABOUT 20-120 MINUTES WITH MICROWAVE ENERGY AND SIMULTANEOUSLY EXPOSE TO HEATED AIR TO WHICH MOISTURE HAS BEEN ADDED AT A VELOCITY OF AT LEAST ABOUT 100FT/MIN TO BRING THE FINAL MOISTURE TO ABOUT 4%-12%
↓
OPTIONALLY REDUCING APPLIED MICROWAVE POWER DURING THE FIRST 20-40 MINUTES OF DRYING TO BETWEEN ABOUT 1/3 TO 2/3 THE INITIAL POWER APPLIED AND REDUCING THE RATE OF MOISTURE ADDITION BY AS MUCH AS 2/3 OF ITS INITIAL LEVEL AFTER PRODUCT MOISTURE HAS BEEN REDUCED TO ABOUT 20%.

METHOD OF MAKING DEHYDRATED POTATO

1. Field of the Invention

The present invention relates to dehydrated white potatoes and a method of producing them.

2. The Prior Art

The present invention is concerned with the production of dehydrated potatoes in piece or chunk form, as distinguished from the production of flakes or granules of potato which form a mash upon addition of water or milk. The finished potato pieces should be free from fat or oil. Thus, the invention is not concerned with partially or completely dehydrated french fries or other oil fried potatoes that are characterized by being brown on the surface and having a substantial fat or oil content. The present invention for convenience will sometimes herein be referred to as "oil-free" potato pieces to distinguish them from oil containing potatoes such as potato chips, french fried potatoes, etc. The terms "fat" and "oil" are used herein synonymously to designate an edible glyceride in either solid or liquid form. The present dehydrated potato product should, after water is added, reconstitute to form pieces of undarkened oil free potato similar to freshly boiled or steamed cut pieces of potato.

Before the discovery of America, the white potato was cultivated and dehydrated by American Indians in South America by allowing the potatoes to lie out in the sun at high altitude where a substantial amount of drying would take place by evaporation. The potatoes were pressed occasionally by stepping on them to expel additional moisture. In modern times, many processes have been developed for dehydrating potatoes in piece form, but the commercial success of these processes has been achieved in spite of substantial product deficiencies which make the present day dehydrated potato product entirely unsuitable for some applications.

The major method used commercially for dehydrating oil free, cut potato pieces is convection drying in ovens or dryers employing conventional heat transfer mechanisms, with gas, oil, steam, tubes or electrical heating elements as primary heat sources. Although it has been manufactured and sold extensively, the product is not entirely satisfactory. The bulk density of the product is about 0.28 to 0.30 gm/cc because it has collapsed substantially during the driving process. The shrinkage of the original pieces is about 68–77% of the original piece thickness and the blue value may be well over 100 usually about 150–160 as measured by the blue value test described in *Food Technology* (August 1955) Volume 9, pages 393–395. The higher the blue value, the more the product resembles library paste.

While the consumer is not vitally concerned with the degree to which the pieces are collapsed, the bulk density and reduction in volume appear to be related to important criteria such as the time required to add back water and the texture of the finished product. For example, pieces of convection dried potato sliced to ⅛ inch thickness and dried in a conventional air convection oven require 20 minutes of simmering at 100° C. to be reconstituted, and even then the pieces are much more rubbery and tough than natural potato slices. It was found that the reconstituted potato as measured by the Kramer Shear Press Test outlined in *Food Engineering*, Volume 29, dated May, 1957 page 57 has a value of about 22–26 pounds force. The damage to the cell structure of the pieces can be seen under the microscope at a magnification of about 20 times. Numerous potato cell boundaries appear indistinct and fused together.

For comparative purposes, in the course of developing the present invention, samples of freeze dried potato were prepared as follows. The potatoes were peeled, sliced to ⅛ inch thick slices, placed in hot water (about 190° F.) containing a discoloration inhibitor comprising $NaHSO_3$ in concentration of 0.64% (by weight) for eleven minutes. The potatoes were then withdrawn and cooled to about 80° F. or below. They were then quickly submerged in a freezer at a temperature −30° F. until thoroughly frozen. The pieces were kept below the freezing point of water, namely, at a temperature of about −10° F. and subjected to a vacuum of 0.1 mm. Hg for a period of 24 hours until dehydrated to a moisture content of about 5.8%. While the resulting pieces were only about 5% collapsed and had a density of about 0.14 gm/cc, when placed in water the pieces largely disintegrated into a lumpy mash-like consistency with no piece identity after about 8 minutes, that is to say, the original pieces could no longer be clearly differentiated and it is probably for this reason that freeze drying is not used commercially for dehydrating potatoes that will reconstitute when water is added to provide distinct pieces of potato. Accordingly, the product was not saleable as a dehydrated potato piece. The natural potato flavor was present, but the level was only about half way between none and the high level observed when fresh potato pieces are cooked and served. The blue value was relatively high at 465 which indicates a significant amount of starch cell damage. This tends to make the product more paste-like in consistency. In addition, the color was an unappetizing white to grey color unlike natural potatoes.

In developing the present invention, it was found that the damage done to the potato pieces during conventional convection drying increases as size of the pieces is increased. Thus, in the past it has been necessary to work with pieces no larger than about ¼ inch square and preferably having one dimension that is not greater than ⅛ inch. There are many food products which would benefit from the availability of dehydrated potato pieces of a relatively large size, e.g., ⅜ inch × ½ × ¾ inch. Examples are dehydrated soups and stews; and homemade potato salads, "American" fries; and boiled potato pieces, to name but a few. If the standard air convection oven drying method is attempted for preparing pieces of this large size, the rehydrated potatoes are tough and rubbery. They have a relatively low level of potato flavor and absorb little water, for example, about 2.7 times the weight of the potato. The drying time is also excessive at about 8.5 hours. The general objective of the invention is to eliminate the problems outlined above and includes the following specific objectives.

The provision of a dehydrated oil free potato that will reconstitute to form easily identified individual pieces of cut potato that remain intact similar to the original cut pieces in size and shape and can be reconstituted in water at 100° C. in less than 20 minutes in the case of dices ⅜ inch thick and less than 10 minutes for dices ⅛ inch thick. The finished product should exhibit a grainy natural texture and a high degree of natural potato flavor. Another specific object of the invention is to provide dehydrated potatoes that will have these properties even though relatively large in size, for example ⅜ × ½ × ¾ inch.

All quantities and percentages herein are indicated on a weight basis.

SUMMARY OF THE INVENTION

In accordance with the present invention, a dehydrated oil free potato product is provided that consists essentially of cut pieces of potato tissue from the tuber of *Solanum tuberosum* with the tissue cells together in the same relationship as in life. The product is porous and contains 12% moisture or less. The color is from yellow to cream color. The surface of each piece is substantially uniform and is composed of uniformly distinct individual potato cells as observed at a magnification of about 20 times with the boundaries well defined between most of the potato cells but with a few of the boundaries (less than 10%) fused together. Since characteristics vary with the size of the piece and especially its thickness, the characteristics described below will be those of slices ⅛ inch thick. For ⅛ inch thick slices, the product has the following characteristics: a blue value of less than 100, percent collapse after drying is on the order of about 40-58% of the original slice thickness and the bulk density of the pieces is between about 0.20 and 0.25 gm/cc. The product exhibits the following characteristics after being reconstituted in 100° C. water for about ten minutes: a Kramer shear press value is between about 12 and 18 pound force and usually between about 16 and 17 pounds force. Its texture is grainy, similar to natural cooked potato, it has a high degree of natural potato flavor, pieces remain distinct from one another and absorb from about 3.75 to about 5 times their own weight of water during reconstitution. The blue value is typically between about 50 and 54. The reconstitution ratio expressed as weight of water to weight of dry potato is usually between about 4.5 and 4.9 after steaming and simmering in water for 8-10 minutes.

A preferred method of making the product is to peel and slice fresh potatoes, blanch the slices in steam or water, expose the pieces to a discoloration inhibitor, and cool them by exposing them to a cooling medium such as air or water at a temperature of 60°-80° F. for a period of about 6 to 20 minutes to bring the inside temperature down to about 80° F. or below. The pieces are then dried by exposing them to microwave energy and simultaneously to hot air to which moisture is added to maintain the average humidity in the oven above at least 83% for most of the drying period. Microwave energy provides 50-90% of the energy input. Drying is carried out for a period of at least 15 minutes to bring the final moisture content to 12% or below, and during portions of the drying process the microwave power and preferably the rate of moisture addition as well are reduced to between about ⅔ to ⅓ of their original values. The ratio of pounds of added moisture per pound of starting product $\times$ volume in ft.$^3$ is preferably between about $1.7 \times 10^{-3}$ to $15 \times 10^{-3}$ initially.

One of the most surprising characteristics of the dehydrated potato in accordance with the invention is that while it exhibits the grainy natural texture of freshly cooked potato, it retains its piece identity, that is to say, the pieces do not fall apart during the rehydration process. The natural texture is exhibited by the Kramer shear press test which is between about 14 and 18 pounds force. The product exhibits an excellent natural yellowish cream color of natural potatoes rather than the white to grey shade exhibited by freeze dried potatoes. The product can be reconstituted rapidly (less than 10 minutes in simmering water for ⅛ inch slices) and has a high level of natural potato flavor when evaluated in standard taste panel tests. Another advantage is that these characteristics can be obtained even in large size pieces. Although tests have been conducted only on those with the smallest dimension as large as ½ inch the results indicate that even larger size pieces could be prepared without suffering in quality. In the case of either freeze dried or convection dried (oven dried) products on the other hand, the results are even worse than those outlined above for products processed in the same way with regard to texture after rehydration, rehydration time, color, etc.

The figure is a flow sheet illustrating a preferred process for preparing potatoes in accordance with the invention.

In the accomplishment of the foregoing and related ends, the invention then comprises the features hereinafter fully described and particularly points out in the claims, the following description setting forth in detail certain illustrative embodiments of the invention, those being indicative, however, of but a few of the various ways in which the principles of the invention may be employed.

DESCRIPTION OF THE DRAWING

The drawing presents a flow chart for a preferred embodiment of the invention.

DESCRIPTION OF THE PREFERRED EMBODIMENTS

As mentioned briefly above, the invention is concerned with providing an oil free or virtually oil free dehydrated potato as distinguished from french fried potatoes, potato chips and the like all of which in addition to being browned on the surface contains substantial quantities of fat or oil. Dehydrated potatoes in accordance with the present invention are pieces of cut potato tissue from the tuber of *Solanum tuberosum* with the tissue cells bonded together in the same relationship as during life, that is to say, the pieces retain their tissue identity and are not reduced to a slurry or mash at any stage.

The product is characterized by being relatively porous. The porosity of the surface can be seen and distinguished from that of conventionally dried pieces by observing the surface of the dried product, or the reconstituted product after being placed in hot or even cold water. The porosity of the surface is fairly easily observed, for example, under a binocular microscope at a magnification of about 20 times. At this magnification the surface of the product can be seen to be composed of uniformly distinct individual potato cells with boundaries which are well defined but with a few of the boundaries (less than about 20%) fused together. The surface cells of a fresh cooked potato appear remarkably similar except that less cell shrinkage is observed and none of the cell boundaries appear to be fused together in a freshly cooked potato. In a convection dried potato about 50% of the individual observable potato cells have a relatively undifferentiated glazed surface and the tops of the potato cells appear flat whereas with the invention about 80% of the surface can be seen to comprise individual, distinct potato cells having rounded tops and only the remaining 20% is glazed.

The contrast in appearance between the dehydrated potatoes of the invention and hot air dried or freeze dried is remarkable. The convection dried potatoes prepared for example, in a gas fired oven show numerous potato boundaries that are indistinct and fused together. The individual cell shrinkage is much greater in prior products which shrink to about 32% of their original thickness in the case of ⅛ inch slices. In the case of freeze dried potatoes, essentially no cells are fused together at the cell surface.

The dried product prepared in accordance with the invention contains less than 12% moisture and usually about 4-9% moisture. It has a yellowish cream color which is similar to that of a freshly cooked potato that has not been dehydrated.

The finished product of the invention, in addition, when ⅛ inch thick, is characterized by having a blue value of less than about 100 and usually less than 75 as determined by the blue value test described in *Food Technology*, Volume 9, pages 393-395. The percent collapse of the dried pieces originally ⅛ inch thick is on the order of about 40-58%, typically 45% of the original slice thickness. This corresponds with the bulk density of between about 0.20 and 0.24 gm/cc. Another distinguishing characteristic of the invention is that it can be reconstituted in simmering water (212° F.) in less than 20 minutes, about 10 minutes being typical for ⅛ inch thick slices and will remain intact and retain its identity. During rehydration, the pieces absorb about 3.75 to 5 times their own weight in water.

The texture after reconstitution as described is measured by chewing the product and its ability to be pierced by a fork and cut by a fork. Additionally, by bending each piece manually, one determines whether the pieces break cleanly at the point where they are bent. As adjudged by these standard panel tests, the product of the invention is found satisfactory and is found to have a grainy texture similar to that of natural cooked potatoes that have not been dehydrated. The texture can also be determined by using the Kramer shear press test referred to above. The products of the invention have a Kramer shear press value of about 12 to 20 pounds force and typically between about 16 and 17 pounds force compared with about 5 for freeze dried potatoes and 24 for convection dried potatoes. In taste panel tests, the product also exhibits a high degree of natural potato flavor and no off-flavor.

A preferred process for preparing the potatoes will be best understood by reference to the figure. Tubers of the white potato, *Solanum tuberosum* which may be, for example, of the Kennebec variety are first peeled in any conventional manner for example by lye peeling, abrasion peeling or steam peeling. They are then subdivided into pieces, for example, by slicing them. The slices can have a variety of sizes, for example from about ⅛ inch thick to about ½ inch thick in the case of the production of large potato chunks to be used in a variety of products such as potato salads and stews. For scalloped and au gratin potatoes, a convenient size is ⅛ inch thick slices. For hash brown potatoes, shreds of about ⅛ × ¼ × 1 inch perform admirably. The thickness of the piece is not, however, critical and in general it can range from about 1/16 inch up to 1 inch or more in thickness.

After slicing, the tubers are blanched in either steam or water but water is the most convenient for the application of a color or discoloration inhibitor. The blanching process is not necessarily intended to completely cook the potato. After blanching, the pieces retain a slight hardness when pressed between the fingers and cannot be mashed easily by manual pressure. In addition, the blanched pieces exhibit some of the raw taste and texture of uncooked potatoes when chewed. The balance of the cooking process is achieved during drying and possibly when the potatoes are reconstituted by placing them in boiling water.

If water is used for blanching, good results can be achieved at temperatures between about 150° and 205° F. but preferably between about 160°-200° F. for between 6 and 20 minutes with the longer times being used at lower temperatures and vice versa to achieve optimum results. It is preferred that a discoloration inhibitor such as $NaHSO_3$ be used to prevent browning later on by providing a quantity of $SO_2$ in the tissue. The amount of $SO_2$ present in the final dehydrated product can range from about 1 to 1500 ppm but is preferably within the narrower range of from about 100 to 300 ppm. The discoloration inhibitor per se forms no part of the invention. Any suitable commercially available discoloration inhibitor can be used among which are $NaHSO_3$, $Na_2SO_3$ and gaseous $SO_2$.

After blanching, the pieces are cooled by exposing them to a cooling medium such as air, gas or water for sufficient time to reduce the internal temperature to at least about 80° F. Water is greatly preferred since it will also function to rinse off excess sodium bisulfite.

As soon as the internal temperature of the product is 80° F. or less and the excess sodium bisulfite and free surface starch rinsed off, drying can be started. Cooling has the effect of toughening the potato cell walls and tends to produce starch retrogradation.

Drying is accomplished in a microwave oven of either a batch type with a single door through which the product is introduced and removed or a continuous microwave oven which the product enters on a conveyor through a door at one end and leaves through a second door at the other end. A continuous oven is preferred. A typical continuous microwave oven that was found suitable in connection with the invention has a microwave oven cavity measuring about 3 × 3 × 5 feet. It is provided with a 5 mesh fiberglass reinforced silicone conveyor belt at the bottom thereof that extends from an inlet door at one end to an outlet door at the other end. The conveyor runs at the rate of about 0.3 to 3.3 feet per minute to maintain the product within the oven for a period of about 1.5-17 minutes with longer residence times obtained by reciprocating the belt back and forth within the cavity. Microwave ovens are currently restricted by FCC requirements to operate at either 915 or 2450 MHz but other wave lengths are possible if and when other frequencies come into commercial use. In any event, the microwave energy is supplied in the amount of about 2-3.5 kilowatts for every ten pounds of product. Thus, for example, if there is 8 pounds for product in the oven then the microwave energy should be supplied initially at about 2.5 kilowatts.

The oven used during test work had water-type end loads for absorbing escaping microwave energy. Thus, the total power supplied to the oven was about twice the amount stated above in each case since much of the provided power is absorbed by the water in the end loads or attenuation tunnels and is unavailable to the product. If too much microwave power is used initially, the potatoes will be quickly brought to a high temperature which may damage the tissue through case hardening or burning. To prevent this kind of damage, the amount of power used for each ten pounds of product is maintained between about 2 and 5 kilowatts, but preferably between the narrower range of about 2 and 3.5 kilowatts.

The microwave energy does not provide all of the energy used for drying. About 10-50% of the energy is provided by air heated to between 75°-255° F., typically 100°-150° F. to which moisture has been added in the form of a suspended mist, vapor or steam. Due to the moisture liberated from the product during drying, the environment within the oven is somewhat humid even without adding moisture to the air but this has been found unsatisfactory for the purposes of the present invention. Moisture can be added in the form of a mist, for example, from a nebulizer or steam. However, to be effective the moisture should be in the form of vapor by at least the time the air stream strikes the product. The addition of steam is, therefore, preferred. The added moisture should bring the initial relative humidity to about at least 83% and preferably 85% or more. The drying should be carried out with sufficient time to reduce the final moisture content to 12% or below but preferably between about 4-9%. This can usually be accomplished in a period of about 15 minutes or more and usually about 20-120 minutes. It is preferred that the drying air move relative to the product. The best results are achieved at linear velocities of 100 feet per minute or above.

In preferred practice, the microwave power is reduced, preferably uniformly, during the first 15 to 40 minutes of operation to about ⅛ to ⅔ of the initial applied microwave power. Moisture injection may or may not be, but in some instances is preferably reduced by as much as ⅔ of its initial addition rate after product moisture has been reduced to about 20% at which point the moisture addition rate is held constant. The ratio of pounds of added moisture per pound of starting product × oven volume in ft.$^3$ is preferably between about $1.7 \times 10^{-3}$ to $15 \times 10^{-3}$. During the time before the piece moisture has dropped to 20%, the temperature and flow rate of the heated air is maintained constant. Good results have been achieved with an air temperature of 130° F. and a linear flow rate of about 500 feet per minute.

The process of the invention will be better understood by reference to the following examples.

EXAMPLE I

Kennebec potatoes were abrasion peeled and sliced to ⅛ inch thickness. The pieces were then blanched in water containing 0.06% sodium bisulfite for 11 minutes at 190° F. The pieces were then cooled in cold well water for 10 minutes until they reached 70° F. The pieces were then divided into three batches and dried in accordance with Runs 1-3 below. In all of runs 1-3, the potatoes had a bed depth of one inch with approximately 15% void space.

Run 1 — Invention

Eight pounds of potato were placed in an oven cavity measuring 3 × 5 feet. 3.5 Kilowatt total microwave energy was applied (about 1.75 kilowatt coupled) at 2450 MHz. Hot air was introduced at a temperature of 130° F. and a linear flow rate of 500 feet per minute. Simultaneously, steam was injected into the hot air stream entering the oven at a pipe pressure of 3 p.s.i. (about 1.1 pounds per hour). The drying time was 40 minutes and the final moisture 8.5%.

Run 2 — Microwave Energy and Unheated Air

The product was dried in the same oven with the same microwave setting except that room air at 70° F. was passed through the oven at 100 feet per minute. Drying was accomplished in 39 minutes and the final moisture was 6.67%.

Run 3 — Hot Air Oven

The product was placed in conventional hot air oven that was gas fired and held at a temperature of about 150° F. until the product reached a final moisture content of 7.5% (600 minutes).

The results of Runs 1 through 3 are as follows:

| Run | Product Condition | Reconstitution in simmering hot H$_2$O Time, Minutes | Rehydration Ratio[4] | Potato Flavor[1] | Off-flavor[1] | Mealy Texture[1] | Tenderness[2] | Overall Hedonic[3] |
|---|---|---|---|---|---|---|---|---|
| 1 | Dry but unburned | 6.5 | 4.63 | 32.7 | 19.8 | 38.8 | 20.0 | 36.2 |
| 2 | ¾ths burned | 6 | 4.66 | 27.2 | 24.0 | 24.8 | 25.7 | 14.5 |
| 3 | Dry but unburned | 27 | 3.39 | 18.5 | 29.7 | 19.8 | 35.7 | 17.2 |

[1]0-60 (low-high)
[2]0-60 (tender-tough/hard)
[3]0-60 (dislike-like)
[4]weight of water/weight of potato It can be seen from the results that when the air passed through the microwave oven cavity is not heated, ¾ths of the product was burned and the flavor suffered accordingly. The dark color of the burned material was clearly unacceptable from a commercial standpoint. On the other hand, the product of the invention (Run 1) was dry but unburned and had a flavor value of 32.7, a mealy texture value of 38.8 compared with 24.8 for Run 2, a tenderness value of 20 compared with 25.7 for the Run 2 and an overall hedonic rating of 36.2 compared with 14.5 for Run 2.

The products dried in a conventional hot air oven (Run 3) required much more time, 600 minutes, for drying, but it was the toughness of the product, lack of mealiness and low overall hedonic rating of 17.2 together with the fact that it took almost a half an hour to reconstitute the product in boiling water that renders it commercially unacceptable. By contrast, the hedonic rating was almost double for the invention and reconstitution in boiling water took only 6½ minutes, about one fourth as long.

EXAMPLE II

Kennebec potato tubers were abrasion peeled, sliced to ⅛ inch thick slices using an Urshell Model CC slicer. The slices were blanched for 11 minutes at 190° F. in hot water containing 0.64% NaHSO$_3$ solution and cooled in water at 50° F. for ten minutes. The potatoes were divided into three batches that were processed as set forth in Runs 4, 5 and 6 as follows.

Run 4 — The Present Invention

Eight pounds of slices prepared as described immediately above were dried on a perforated silcone fiberglass belt in a microwave oven cavity having the dimensions 3 × 3 × 5 feet. Warm air was convected through the oven cavity at a linear speed of 485 feet per minute. Steam was injected into the air at a line pressure of 6 p.s.i.g. (2.1 pounds per hour). The air had a temperature of 130° F. and the relative humidity in the oven cavity was about 84%. The microwave power was uniformly reduced from an initial total power level of 5Kw to 3 Kw during the forty minutes of processing time and held constant.

Run 5 — Convection Drying in a Gas Fired Hot Air Dryer

Eight pounds of the same slices as used in Run 6 were placed in two perforated steel trays and dried at 150° F. and 70% relative humidity for ½ hours.

Run 6 — Freeze Drying

Eight pounds of the slices prepared as set forth above were frozen in a blast freezer at −30° F. and then dried while frozen in a freeze dryer under 0.1 mm. Hg vacuum for 24 hours.

The results of Runs 4, 5 and 6 are set forth in the following table.

The results indicate that only the product from Run 4 (the invention) had a profile of characteristics which made it desirable as a reconstituted potato piece product. The product of Run 4 when reconstituted had a natural grainy texture, a high degree of natural potato flavor, a distinct piece identity, a fast (9 minute) reconstitution time, and a high reconstitution ratio equal to about the natural water content of undried slices. The Run 5 convection dried product suffered in comparison by having a rubbery, tough texture, low retention of natural potato flavor, slow 20 minute reconstitution time, and a low reconstitution ratio. The Run 6 freeze dried product suffered by having lumpy, mash-like texture, virtually no piece identity, and only moderate retention of natural potato flavor.

EXAMPLE III

Kennebec potatoes were abrasion peeled, sliced to dices abpout ⅜ × ½ × ¾ inch then blanched in water containing 0.06% NaHSO₃ for 20 minutes at 190° F. They were then cooled in water for 10 minutes until their internal temperature reached 70° F. The potatoes were then divided into two batches which were used in Runs 7 and 8 respectively.

Run 7 — The Invention

Eight pounds of the blanched potato product was placed in a microwave oven cavity measuring 3 × 3 × 5 feet on a perforated silicone fiberglass conveyor. Microwave power was applied initially at 5 Kw (about 2.5 Kw coupled power) and was reduced at a uniform rate to 3.0 Kw during the first 40 minutes of drying and held constant. Simultaneously, heated air at a temperature of 130° F. was introduced at a linear rate of 485 feet per minute. Steam was injected into this air stream initially at a pressure of 6 p.s.i.g. pipe pressure (2.1 pounds per hour). The steam injection rate was reduced uniformly during the first 60 minutes of processing to 2.0 p.s.i.g. pipe pressure (0.71 pounds per hour) and held constant. Initially the relative humidity was about 85% and with the lower steam introduction rate at the end of the first 60 minutes, the relative humidity was about 83%. The total processing time in the microwave oven was 1½ hours. The product was well dried, very slightly puffed and a small fraction (about 10%) was scorched. The reconstitution ratio was 3.6, water to solids. The rehydrated product was tender, not rubbery and possessed good potato flavor after rehydration in simmering water for 16 minutes.

Run 8 — Hot Air Oven

The other portion of the original batch of potatoes was convection dried in a gas fired oven by spreading out 8 pounds of the product uniformly on two perfo- Table 1

|  | Run 4 Invention | Run 5 Convection Dried | Run 6 Freeze Dried |
|---|---|---|---|
| Moisture | 7.95% | 9.69% | 5.77% |
| SO₂ | 32 ppm. | 6 ppm. | 6 ppm. |
| Microscopic evaluation at 20 power (binocular microscope) | Surface is uniformly composed of distinct potato cells with boundaries well defined, with a few fused together. | Numerous potato cell boundaries indistinct and fused together. | Surface is uniformly composed of distinct potato cells with boundaries well defined. No cells fused together. |
| Reconstitution Time | 9 minutes | 20 minutes | 8 minutes |
| Reconstitution ratio expressed as wt.water/wt. dry potato | 4.70 | 3.60 | 7.80 |
| Condition after Reconstitution | Piece identity: Dinstinct | Piece Identity: Distinct | Largely disintegrated into a mash after 10 minutes. Virtually no water drained out. |
| Natural Potato Flavor | High | Low | Medium |
| Texture | Grainy, natural texture | Rubbery & tough | Lumpy & mash-like. No piece identity. |
| Color (Dried) | Yellowish-cream | Yellowish-cream | White-grey |
| Blue Value | 52 | 156 | 465 |
| Dried Slice Thickness | 0.057±.003" | 0.040±.005" | 0.119±.005" |
| %Collapse in Thickness | 54% | 68% | 5% |
| Bulk Density (gm/cc) | 0.101 | 0.111 | 0.062 |
| Piece Density (gm/cc) | 0.22 | 0.29 | 0.14 |
| Kramer Shear Press | 16.3 lb. | 24.2 lb. | 5.1 lb. | rated steel trays. The product was dried in convected air at a temperature of 150° F. for 8½ hours.

The product was found to be very hard on the outside and moist on the inside. The horny dry outer layer prevented satisfactory drying of the interior in a reasonable period of time. This is sometimes referred to in the art as being case hardened. When reconstituted in boiling water for 30 minutes, the reconstitution ratio was found to be 2.7. The water reconstituted product was tough and rubbery and had a low potato flavor. It was considered unsatisfactory for commercial use.

The physical dimensions of Runs 7 and 8 products are compared in Table 2. As in other runs with ⅛ inch slices, the percent collapse during dehydration is found to be far less for the product of the invention, with bulk density and piece density also lower in about the same ratios. The differences in these physical properties correlate with the superior texture and reconstitution properties of the Run 7 product.

Table 2

|  | Run 7 Invention | Run 8 Convection Dried |
|---|---|---|
| Percent Collapse in Thickness | 32% | 57% |
| Bulk Density, gm/cc | 0.24 | 0.39 |
| Piece Density, gm/cc | 0.39 | 0.58 |

EXAMPLE IV

Potatoes were prepared as in Example II and the resulting slices were divided into two batches to further delineate the effect of adding moisture into the hot air introduced into the oven.

Run 9

Eight pounds of these potatoes were placed in the same microwave oven described above and power was initially applied at 5 Kw total power. The power was reduced at a uniform rate during the first 32 minutes of operation to a total power level of 2.8 Kw and then held constant. Air heated to 130° F. was forced into the microwave oven cavity at a linear velocity of 330 ft./min. Steam was introduced into the oven cavity at a steam line pressure of 15 p.s.i.g. (5.30 pounds per hour) and was held constant. Drying was carried out for a total of 45 minutes.

Run 10

Eight pounds of the same potatoes as used in Run 9 were placed in the same microwave oven and processed in exactly the same manner except that no moisture was introduced into the hot air stream entering the microwave oven. Drying was conducted for the same length of time, 45 minutes.

The results are set forth in Table 3.

The data indicates that the product from Run 9 (steam injected) was superior to the product from Run 10 (no steam) with regard to having a mealier, more tender texture, lower level of off-flavor, and a shorter reconstitution time.

Table 3

|  | Run 9 Moisture Added in the Form of Steam | Run 10 No Steam Added |
|---|---|---|
| Average RH in oven cavity | 86 | 82 |
| Steam Injection Rate | 5.30 lb. mass/hr. from pipe at 15 p.s.i.g. (0 p.s.i.g. in cavity) | 0 |
| Reconstitution data: |  |  |
| Reconstitution time | 11 minutes | 16 minutes |
| Taste Panel Results: |  |  |
| Mealiness (0–60, low to high) | 36 units | 25 units |
| Off-flavor (0–60, none to high) | 5 units | 10 units |
| Tenderness (0–60, soft to hard) | 13 units | 23 units |
| Final Moisture | 7.7% | 9.1% |
| SO$_2$ | 946 ppm. | 905 ppm |
| Water Absorption | Absorbs water relatively well. | Absorbs water at a slower rate. |

EXAMPLE V

Dehydrated hashbrown potatoes were prepared by slicing prepeeled tubers to ⅛ × ¼ × 1 inch size, blanching them in 184° F. water containing 0.06% NaHSO$_3$ for 11 minutes, cooling them in 56° F. water for 12 minutes, and drying them using the same apparatus as in the previous examples. Eight pounds of these shreds were dried to about 6.7 percent moisture in 40 minutes using 3.5 Kw total microwave power (about 1.75 Kw coupled), 130° F. air at about 500 ft./min. velocity, and stream injection at about 1.1 pounds per hour. The resulting product, when reconstituted, had excellent characteristics, and was superior to conventional convection dried product in having a more tender, mealy texture, a lower level of off-flavor, and a reconstitution time which was 40 percent shorter.

EXAMPLE VI

Dehydrated shredded potatoes were prepared by slicing prepeeled tubers to a 1/16 × 5/32 × 1¾ inch size, blanching them in 184° F. water containing 0.18% NaHSO$_3$ for 6 minutes, cooling them in 56° F. water for 6 minutes, and drying them using the same apparatus as in Examples I–IV. Eight pounds of the shreds were dried to about 5.5 percent moisture in 40 minutes using an initial total microwave power level of 5.0 Kw (about 2.5 Kw coupled) which was decreased in steps to 2.0 Kw towards the end of the drying period, convected air at about 380 ft./min. velocity and 130° F., and an initial steam injection rate of 2.1 lbs./hr. which was decreased intermittently to 0.7 lbs./hr. towards the end of the drying period. The product suffered no scorching or burning during drying, and, when reconstituted, had flavor and texture characteristics similar to those of analagous fresh shred product.

EXAMPLE VII

Dehydrated potato slabs were prepared using thicknesses of ¼ and ¾ inch in order to further delineate the differences in density and shrinkage which exists between pieces dried using conventional means and those dried by the present invention. After blanching and cooling the slabs by the usual methods, portions of each size were dried by the present invention and by convection drying. Convection drying was done at 150° F. for 10 hours for the ¼ inch slabs and 17½ hours for the ¾ inch slabs. Using the invention, the ¼ inch slabs were dried in 42 minutes using an initial total microwave power level of 5.0 Kw which was reduced in steps to 3.0 Kw towards the end of drying, convected air at 130°

F. and 485 ft./min. velocity, and steam injection at 1.1 lb./min. The ¾ inch slabs were dried using the same parameters in 47 minutes. Physical data are given for these products in Table IV, indicating again that percent shrinkage is far lower for products of the invention with piece density and bulk density also reduced.

Table 4

|  | ¼ Inch Slabs | | ¾ Inch Slabs | |
| --- | --- | --- | --- | --- |
|  | Invention | Convection Dried | Invention | Convection Dried |
| Percent Collapse in Thickness | 46 | 77 | 44 | 73 |
| Bulk Density, gm/cc | 0.15 | 0.22 | 0.31 | 0.46 |
| Piece Density, gm/cc | 0.24 | 0.47 | 0.40 | 0.60 |

The degree of shrinkage that takes place during drying in the present invention compared with the prior art can be clearly seen in the following table.

Table 5

Summary of Percent Collapse Data For Dried Potato Slices

| Piece Type | Smallest Dimension | Percent Collapse During Dehydration | |
| --- | --- | --- | --- |
|  |  | Invention | Convection |
| ⅛" Slices | ⅛" | 54% ±2 | 68 ±2% |
| ¼" Slices | ¼" | 46% ±2 | 77 ±2% |
| ¾" Slices | ¾" | 44% ±2 | 73 ±2% |

What is claimed is:

1. A process for dehydrating potato pieces from the tuber of the potato *Solanum tuberosum* to form substantially oil free dried potatoes with the tissue cells together in the same relative relationship as during life, said process comprising peeling the potatoes, subdividing them into pieces having a thickness between about 1/16 and ½ inch, blanching the potatoes in steam or water for sufficient time to bring the internal temperature up to at least about 150° F. but without causing the complete cooking of the potatoes, cooling and rinsing the potatoes to bring the internal temperature thereof to about 80° F. or below, drying the potatoes with microwave energy and simultaneously exposing the potatoes in heated air at 75° F or above to which moisture has been added to bring the initial relative humidity to at least 83%, said heated air having motion relative to said potatoes and being supplied in sufficient quantity to bring the final moisture content of the potato to 12% or less and maintaining the potatoes in an oil free condition throughout the process.

2. The process of claim 1 in which, during the drying step, the applied microwave power is reduced during the first 20–40 minutes of drying to between about ⅓ to ⅔ of the initial power applied.

3. The process of claim 1 wherein the rate of moisture addition is reduced to between about ⅓ and ⅔ of the initial rate during the drying period.

4. The process of claim 2 wherein the ratio of pounds of added moisture per pound of starting product multiplied by the oven volume in Ft.$^3$ is between about $1.7 \times 10^{-3}$ and $15 \times 10^{-3}$.

5. The process of claim 1 wherein the potatoes are sliced to a thickness of about ⅛ inch and are blanched in hot water at a temperature between about 160°–200° F. for 6 to 20 minutes and are then cooled in water to bring the internal temperature to 80° F. or below.

6. The process of claim 1 wherein the product is dried in a microwave oven with microwave power providing between 50–90% of the drying energy and the remaining 50–10% of the drying energy is provided by the heated air with added moisture to bring the final moisture content to between about 4–12%.

7. The process of claim 1 wherein during the drying step the microwave power is reduced during the first 30 minutes of drying to about ½ of the initial applied microwave power and the moisture addition rate is reduced to between about ⅓ and ⅔ of the initial rate.

8. The process of claim 1 wherein the dried product is reconstituted in hot water in less than 10 minutes for ⅛ inch thick slices and 20 minutes for ¾ inch thick slices to produce a product in which the pieces remain intact and distinct from one another, exhibit a relatively high degree of natural potato flavor when compared with freshly cooked undehydrated potatoes, exhibit a grainy natural texture similar to that of undehydrated potatoes, a blue value between about 50–54 and a Kramer shear press value between about 16 and 17 pounds force.

9. The process of claim 3 wherein said moisture is supplied to said heated air in the form of steam.

* * * * *